US006061430A

United States Patent [19]
Miller et al.

[11] Patent Number: 6,061,430
[45] Date of Patent: May 9, 2000

[54] ENHANCED TELEPHONY SYSTEM FOR PREMISES MONITORING

[75] Inventors: James E. Miller, Highlands Ranch; Adam N. Marx, Boulder, both of Colo.

[73] Assignees: U S West, Inc., Denver; MediaOne Group, Inc, Englewood, both of Colo.

[21] Appl. No.: 08/996,050

[22] Filed: Dec. 22, 1997

[51] Int. Cl.[7] .................................................. H04M 11/04
[52] U.S. Cl. .............................. 379/49; 379/40; 379/421; 379/201
[58] Field of Search ............................... 379/37–51, 201, 379/207, 210, 211, 251, 258

[56] References Cited

U.S. PATENT DOCUMENTS

| | | | |
|---|---|---|---|
| 3,519,745 | 7/1970 | Colman | 379/46 |
| 5,173,932 | 12/1992 | Johansson et al. | 379/47 |
| 5,323,456 | 6/1994 | Oprea | 379/373 |
| 5,557,668 | 9/1996 | Brady | 379/212 |
| 5,563,937 | 10/1996 | Bruno et al. | 379/201 |
| 5,588,037 | 12/1996 | Fuller et al. | 379/57 |
| 5,673,299 | 9/1997 | Fuller et al. | 379/57 |

FOREIGN PATENT DOCUMENTS

| | | | |
|---|---|---|---|
| 2166321 | 4/1986 | United Kingdom | 379/51 |

*Primary Examiner*—Wing F. Chan
*Attorney, Agent, or Firm*—Holme Roberts & Owen

[57] ABSTRACT

An enhanced telephony system for use in premises monitoring is disclosed. More particularly, such system provides an alert signal upon sensing of a predetermined condition of interest at a business or residential premises. The system provides for the receipt of a sensor signal at telephony service equipment, located at the premises in response to the sensing of a predetermined condition of interest. In turn, such telephony equipment is employed, in response to receipt of a sensor signal, to automatically provide at least one of a human-perceivable alert signal at the premises, or the initiation of a telephony call to a predetermined telephone number corresponding with the service control point maintained within a telephony services network. Preferably, the human-perceivable alert signal provided comprises a ringer cadence distinct from that employed in connection with the receipt of incoming telephone calls from third-parties. Such distinct cadence alerts individuals at the monitored premises that the predetermined condition of interest has been sensed. When a telephony call is initiated to a number corresponding with the service control point, additional AIN-enabled features may be included. Such features include directing of an alert call to one or more predetermined numbers corresponding with service companies for monitoring premises, emergency response stations (e.g., fire, police, etc.), call forwarding stations, and mobile stations. Such added features provide a readily configurable system for providing alert signals upon the detection of one or more predetermined conditions of interest at the monitored premises.

19 Claims, 6 Drawing Sheets

ENHANCED TELEPHONY SYSTEM FOR PREMISES MONITORING

FIELD OF THE INVENTION

The present invention relates to the field of telephony-related services, and more particularly, to a telephony system for use in monitoring one or more predetermined conditions at residential and/or business premises.

BACKGROUND OF THE INVENTION

A wide variety of systems have been developed for monitoring conditions at residential and business premises. Such monitoring systems most typically provide for the detection of a predetermined "alarm" condition at a given premises and for some manner of response to the detected condition. By way of example, known monitoring systems include fire/smoke detectors with alarm/sprinkler response, and security motion/pressure detectors with security alarm/security service response.

As will be appreciated, monitoring systems of the above-described nature typically comprise a number of dedicated components to carry out the intended monitoring purpose. Such dedicated systems/componentry may be cost-limiting for many applications and can otherwise be difficult to reconfigure. In the latter regard, for example, many security systems are designed/implemented by "turn-key" security system service providers and are not readily adaptable in the event that a different security service provider becomes desirable or otherwise necessary.

Further, many monitoring systems provide only limited response options when a predetermined condition of interest is detected. For example, typical security systems only provide for an audible alarm at the premises and/or the transmission of an alert signal to a specific security service response provider.

SUMMARY OF THE INVENTION

Accordingly, a primary objective of the present invention is to provide for costeffective detection systems that can monitor one or more predetermined conditions at residential and/or business premises.

A related objective is to provide for monitoring systems having response components that are largely already on-premises so as to realize dual functionality.

A further objective of the present invention is to provide for monitoring systems having components that indicate the specific type of predetermined condition detected.

An additional objective is to provide for monitoring systems having response components that are readily configurable/reconfigurable.

Yet another objective of the present invention is to provide an improved premises monitoring system having a plurality of options for response to the detection of a predetermined condition of interest.

These objectives and additional advantages are realized in the present invention which utilizes telephony system componentry in conjunction with the provision of a premises monitoring system response. More particularly, in the present invention one or more predetermined condition sensors may directly interface with telephony system equipment on premises (e.g. one or more telephone devices(s)), wherein upon detection of a predetermined condition, the telephony premises equipment is utilized to provide at least one of (i) a sensory alarm (e.g. audible, visual, etc.) at the monitored premises, and/or (ii) the initiation of a call to a predetermined first telephone number corresponding with a predetermined central office switch maintained in a telephony network, wherein the call is employed to effect a corresponding, predetermined response, as desired by a telephony system customer.

In one aspect of the invention, the sensory alarm, or human-perceivable alert signal, comprises a cadence that is distinct from a cadence utilized with the on-premises telephony system equipment upon receipt of "regular" incoming telephony calls from third-party callers. By way of primary example, where the human-perceivable alert signal is an audible ring at a telephone, the utilization of a distinct ringer cadence alerts individuals at the monitored premises that a particular monitored, predetermined condition of interest has been sensed. Further in this regard, the distinct cadence utilized may be selected from a plurality of distinct cadences, each of which corresponds with a different, predetermined condition of interest monitored at the premises (e.g., via use of different monitoring system sensors).

In another aspect of the present invention, the above-noted predetermined central office switch may be AIN-capable. By utilizing AIN-capable switching capabilities, a number of options for alert responses are possible pursuant to the sensing of a predetermined condition of interest. More particularly, when the AIN-capable switch receives a call pursuant to a sensed condition, the switch may transmit a message to a service control point maintained in the telephony network, such message comprising a call processing record that includes a station number corresponding with the telephony system equipment at the monitored premises. Such station number may in turn be employed at the service control point to retrieve one or more preregistered station numbers from a database (e.g., that cross-indexes the originating phone number with preregistered station numbers). Such preregistered telephone numbers may be pre-established by a telephony subscriber corresponding with the monitored premises.

Upon retrieval of one or more preregistered telephone station numbers, the service control point may then direct a telephony call to one or more corresponding telephony stations. Again, a distinct ringer cadence may be utilized for such calling. In this regard, alert calls can be routed/placed via AIN-capabilities so that in the event a sensed condition at a business or residence, an alert call can be placed to a corresponding residence or business, respectively, or to some other preestablished station number. In the latter regard, and as will be appreciated, the preregistered telephone numbers may correspond with a call forwarding station number, a premises monitoring service company, an emergency response station (e.g., fire department, police department, hospital, etc.), a mobile telephone device, a relative/friend (e.g., in the event of a medical alert) etc., thereby enhancing the likelihood of human contact/response to a sensed predetermined condition.

As indicated, in conjunction with a call placed to a preregistered telephone number, a callee at the corresponding station will be alerted as to the existence of a detected condition of interest at the premises. For such purposes, an AIN-intelligent peripheral may also be employed to interface with the service control point so as to provide an audible message specific to the predetermined condition detected.

In the later regard, a plurality of different sensor types can be interconnected with on-premises telephony equipment, wherein a different, stored telephone number is automatically called upon triggering of each different sensor. Each such telephone number corresponds with a different predetermined service alert switch at a central office, thereby allowing for a system response to be tailored for each particular type of sensed condition. Where AIN-switches are employed, for example, messages can be sent from each to a service control point that permits the service control point and an intelligent peripheral to uniquely respond to each (i.e., since each call processing record will indicate the switch number at which a particular sensor alert call was received).

In a further related aspect of the present invention, the preregistered telephone numbers can be arranged in a database at the service control point so that telephone numbers are called on a preferential or sequential basis. That is, for example, a first registered telephone number can be called in response to the sensing of a predetermined condition of interest. If such call is not answered, another call can then be placed to a second preregistered telephone number.

Finally, use of the AIN-capabilities allows a response call to ring a predetermined number of times, stop for a predetermined period, and then ring a predetermined number of times, and so on. As such, a wide variety of cadence and ring sequence/timing combinations can be utilized.

Numerous additional options and extensions will be apparent to those skilled in the art.

DETAILED DESCRIPTION

Figure 1:
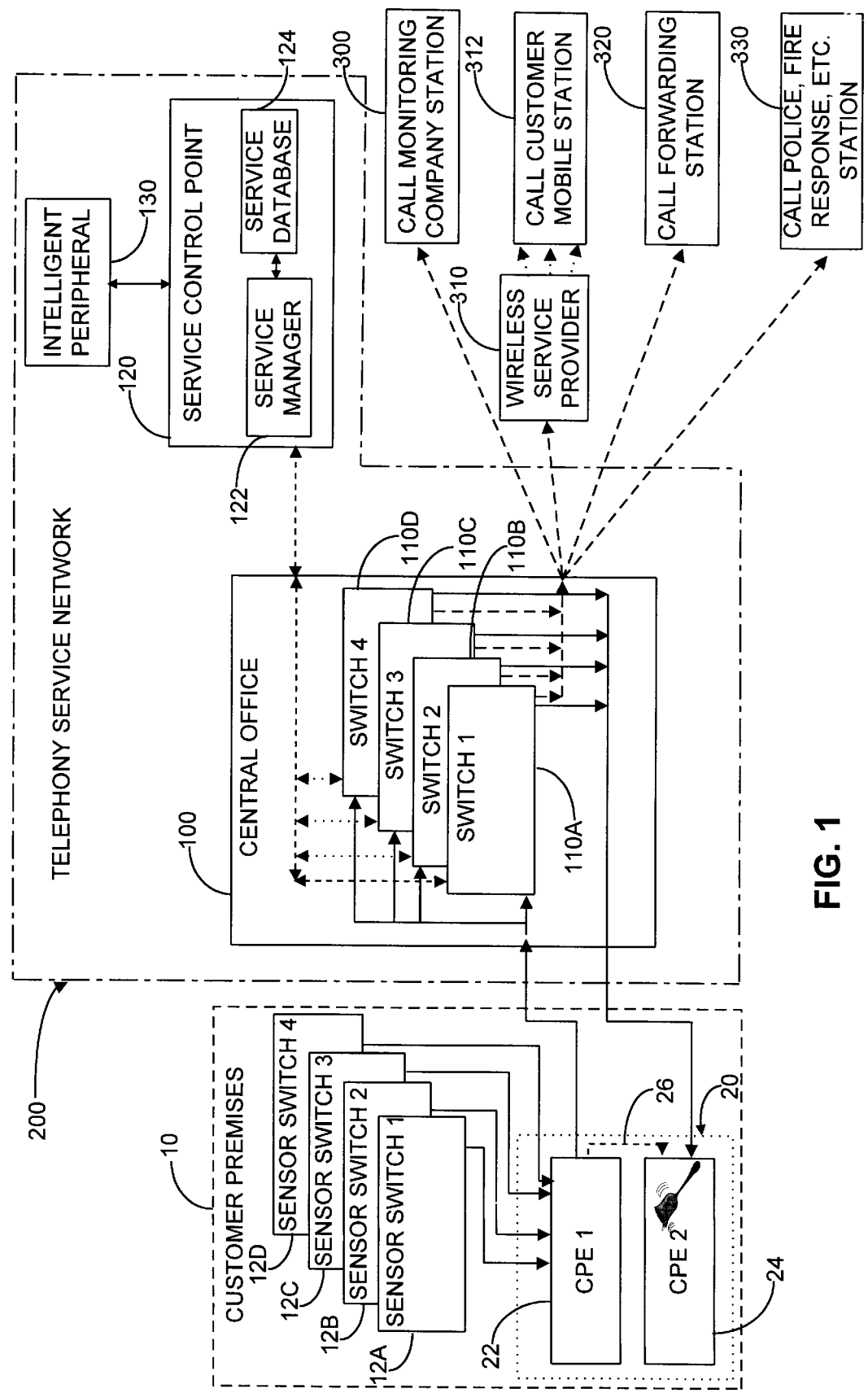
FIG. 1 is a schematic illustration of a system reflecting various embodiments of the present invention.

FIG. 1 illustrates various system components for implementations of the present invention, including components located at an exemplary customer premises 10, and components maintained at a central office 100, optional service control point module 120, and optional intelligent peripheral module 130 maintained in a telephony service network 200. As will be appreciated, in actual implementation numerous customer premises may utilize the componentry described herein to interface with a telephony service network 200 to realize the benefits of the present invention.

With particular respect to exemplary customer premises 10, one or more sensors 12a, 12b, 12c and 12d are provided for detecting one or more corresponding, predetermined conditions of interest at customer premises 10. By way of example, sensor(s) 12 may comprise one or more automatic sensor switches including a fire/smoke sensor, a fluid sensor (e.g. for flooding-prone areas), a security sensor (e.g. a motion sensor, etc.), a home entry sensor, and a sensor for monitoring unauthorized access attempts to computer equipment. Further, sensor(s) 12 may comprise one or more switches that may be manually activated by individuals on premises (e.g. by elderly individuals or others having a physical/medical condition of concern).

Generally, sensor(s) 12 is interconnected to telephony system componentry 20, wherein telephony componentry 20 will provide a responsive signal upon activation of the sensor 12. The customer premises telephony system componentry 20 may comprise a first set of telephony equipment (CPE 1) 22 and a second set of telephony equipment (CPE 2) 24, each of which may be configured to meet the needs of a particular application.

For example, in one approach, CPE 1 22 comprises a subscriber station telephone switch that, upon receiving an activation signal from a sensor switch 12, automatically initiates a call to central office 100. More particularly, such call may be directed to a predetermined telephony service number that corresponds with a predetermined switch 110 located at central office 100. In this regard, a plurality of predetermined switches 110a, 110b, 110c and 110d may be provided at central office 100, each having a different corresponding, predetermined phone number associated therewith, for receiving calls from CPE 1 22 pursuant to the receipt by CPE 1 22 of a corresponding activation signal from sensor 12a, 12b, 12c or 12d, respectively.

As will be appreciated, in this arrangement CPE 1 22 may comprise separate inputs for each of the sensors 12a, 12b, 12c or 12d, with each input triggering use of a different, corresponding, stored telephone number to initiate a call to a corresponding switch 110a, 110b, 110c or 110d. In response to receipt of a call at switch 110, switch 110 is operable to route the call or otherwise place a call to a predetermined telephone number corresponding with CPE 2 24 at customer premises 10. More particularly, switch 110 may direct the responsive call to CPE 2 24 utilizing a ringer cadence that is distinct from the normal ringer cadence utilized in routing regular telephone calls from third-parties to customer premises 10. As will be appreciated, when multiple switches 110a, 110b, 110c, or 110d are utilized, the particular cadence utilized by a switch 110a, 110b, 110c or 110d can be provided in corresponding, predetermined relation to a particular sensor 12a, 12b, 12c or 12d that has been activated. As a result, individuals at customer premises 10, upon hearing the distinct ringer cadence at CPE 2 24 can be alerted to not only the presence of a detected condition of interest at the premises 10, but additionally the specific type of detected condition.

In another approach, CPE 1 22 may comprise a ringer simulation device directly interconnected via line 26 to the CPE 2 24. In such an arrangement, the CPE 1 22 cadence simulator will, upon receiving a message from a sensor 12, send a simulated cadence signal to CPE 2 24 which causes CPE 2 24 to ring utilizing a ringer cadence that is distinct from the normal telephone call cadence utilized at the customer premises 10. As will be appreciated, in the event that multiple sensor switches 12a–12d are utilized at customer premises 10, CPE 1 22 may be configured to provide corresponding distinct cadence simulation signals to CPE 2 24 for enhanced alert purposes.

As noted, CPE1 22 and CPE 2 24 can be configured in a variety of ways depending on the particular application. In this regard, a sensor switch 12 can be connected to an rj 11 outlet of a telephone comprising CPE 1 22. Further, CPE 1 22 and CPE 2 24 may comprise separate telephony devices (e.g., separate telephone call switches). Additionally, in initiating a call from CPE 1 22 (i.e., in response to a detected condition), CPE 1 22 may include in the corresponding call processing record not only the station number corresponding with CPE 1 22 and the predetermined number for alert service switch 110, but additionally include the station number for CPE 2 24 to facilitate a responsive call to CPE 2 24 for alert purposes.

It should be noted that in the first above-noted approach which directs sensor-triggered calls to one or more predetermined alert switch(es) 110 at a central office 100, a number of advantageous modifications and extensions may be employed. In particular, for example, predetermined switch 110 may comprise an AIN-capable switch. For purposes hereof, an AIN-capable switch is a switch that is capable of receiving a call placed pursuant to the dialing of a first telephone number, and (i) routing such call to one or more telephony devices having corresponding telephone numbers that are different than the first telephone number, and/or (ii) suspending processing of the incoming call pending completion of predetermined service tasks desired by a telephony subscriber. By way of particular example, when central office switch 110 comprises an AIN (Advanced Intelligence Network) switch, call processing may be suspended at switch 110 pursuant to which a message is launched to a service control point 120 maintained with the telephony service network 200. As will be appreciated, service control point 120 may be a software-driven node that, upon receiving a message from a predetermined switch 110, will provide call routing/calling instructions back to the central office switch 110 pursuant to preprogrammed functionality. Such call routing instructions may in the form of a digital message(es) comprising a call processing record(s) interpretable by switch 110.

More particularly, service control point 120 may comprise a service manager 122 and a service database 124. The service database 124 may be arranged so that one or more predetermined telephone numbers may be retrieved in response to a call received at predetermined switch 110 from a given customer premises 10. The retrieved numbers may be utilized to generate the call routing/calling instructions. In this regard, calls received at predetermined switch 110 will have a call processing record that includes an originating telephone number corresponding with CPE 1 22 and the predetermined number for switch 10. Upon the provision of such call processing record to service control point 120, service manager 122 may utilize the originating telephone number(s), and optionally the predetermined number for service alert switch 110, to access one or more corresponding, predetermined, or preregistered, telephone numbers in database 124. In this regard, the preregistered telephone number(s) may be as pre-established by a subscriber corresponding with premises 10.

Upon retrieval of one or more predetermined telephone number(s) for a given call, the service manager 122 may generate, supplement or otherwise amend a corresponding call processing record(s) and transmit one or more service output messages (i.e., comprising the new call processing record(s)) back to the switch 110 that has suspended call processing. Upon receipt of such service message(s) at switch 110, a call may then be routed to one or more of a plurality of telephony stations, as indicated in the call processing record(s). As will be appreciated, the ability to configure an alert response calling system via service control point 120 provides great flexibility for a telephony system subscriber. Further, the ability to realize multiple alert response calls enhances the likelihood that human contact will be made. In this regard, it is also noted that the preregistered numbers may be arranged in database 124 for preferential calling in a preestablished sequence. That is, the preregistered numbers can be arranged so that one or more of the preregistered numbers are called only if one or more others of the preregistered numbers are called with no answer thereto. For example, in the event a first preregistered number is called and a connection is not made, then a second preregistered number is called, and so on.

It is also noted that by using AIN-switching capabilities the system may provide for response calls that ring a predetermined number of times, stop ringing for a predetermined time, start ringing for a predetermined time, and so on. Such feature capabilities, together with known ring cadencing capabilities yield numerous call ring patterns to alert callees as to the existence and nature of a particular sensed condition.

As illustrated in FIG. 1, the telephony stations corresponding with the preregistered telephone numbers may include a monitoring company station 300 (e.g., a security service company contracted by the resident at customer premises 10), a mobile phone 312 serviced by a wireless service provider 310 (e.g., contracted by the resident at customer premises 10), a call forwarding station (e.g., as predetermined by the resident at customer premises 10, including a home, business, relative or friend), and an emergency response station 330 (e.g., corresponding with a local police, fire department, etc.). In this regard, it again should be appreciated, that the present invention allows one or more station numbers 300, 312, 320 or 330 to be automatically contacted upon the triggering of a sensor switch 12 in particular accordance with instructions preestablished by the resident of customer premises 10 (or a proprietor of monitored business premises), as reflected in the database 124 that is maintained at the service control point 120 within the telephony service network 200. Further in this regard, it can be appreciated that when a plurality of sensor switches 12a, 12b, 12c and 12d are utilized to detect different corresponding predetermined conditions of interest, and when a plurality of different predetermined switches 110a, 110b, 110c, and 110d are provided at central office 100 for separately receiving calls pursuant to separate sensing at sensor switches 12a, 12b, 12c, and 12d, the service control point 120 can operate to provide call routing instructions specific to the given sensor switch 12a, 12b, 12c or 12d that has been triggered (i.e., each "set" of instructions corresponding with a different "set" of preregistered telephone numbers).

In conjunction with the routing of a given call, service control point 120 may also interface with an AIN-intelligent peripheral 130, whereupon, in conjunction with routing a call to one or more stations, the intelligent peripheral 130 can dynamically create an audible message (e.g., "fire detected at" (pause) "(address)") that is played to a callee upon answering of the call. The callee at a receiving station may also interface with intelligent peripheral 130 to effect some additional predetermined responsive action. Further, in this regard, it should be appreciated that intelligent peripheral 130 may comprise the capability to send/receive messages on an interactive basis with an end-station callee (e.g., pursuant to a voice recognition system). Additionally, it is noted that, in one simple arrangement, telephone componentry 20 and/or switches 110a, 110b, 110c, or 110d may be adapted to provide a distinct tone code to intelligent peripheral 130 in corresponding relation to an alert call triggered by a sensor switch 12a, 12b, 12c or 12d, respectively. In turn, intelligent peripheral 130 can be provided to recognize the tone code (e.g., via DTMR capabilities), and automatically create an appropriate corresponding message.

Operation of one embodiment of the present invention will now be summarized in relation to FIGS. 2 and 3A–3D. Specifically, upon sensing of a trigger condition at a sensor 12 a signal will be provided by the sensor 12 to CPE 1 22. CPE 1 22 will then automatically call a predetermined service number corresponding with a predetermined switch 110 at central office 100 within telephony service network 200.

As will be appreciated, predetermined switch 110 corresponds with a predetermined service number designated by the telephony service provider corresponding with telephony service network 200. In this regard, an alert service corresponding with the present invention may be offered by the telephony service provider on a subscription service basis. In such an arrangement, upon receipt of a call at switch 110 and transmission of a message to service control point 120, the service manager 122 may initially determine, utilizing the originating telephone comprising the call processing record received at switch 110, whether the alert service is active for CPE 1 22. If not, a message can be sent from service control point 120 to switch 110 so as to terminate the call. If the service is active, the generation of a call processing record at service control point 120 may continue.

More particularly, service manager 122 may consult database 124 to determine the applicable call routing instructions. In one arrangement, service manager 122 will always retrieve a telephone number from database 124 corresponding with telephone CPE 2 24 at customer premises 10. In such situations, service manager 122 will then transmit a message to switch 110 comprising a call processing record that includes the telephone number for telephone CPE 2 24. In response to receipt of such message, switch 110 will then route the call to CPE 2 24 utilizing a distinct ringer cadence. In the latter regard, it should be appreciated that current technology allows for switch 110 to utilize at least four different types of ringer cadences when routing calls to a telephone. Preferably, the ringer cadences utilized in connection with the present invention will be one of the three cadences not normally utilized by switch 110 for routing normal telephone calls to customer premises 10.

Figure 2:
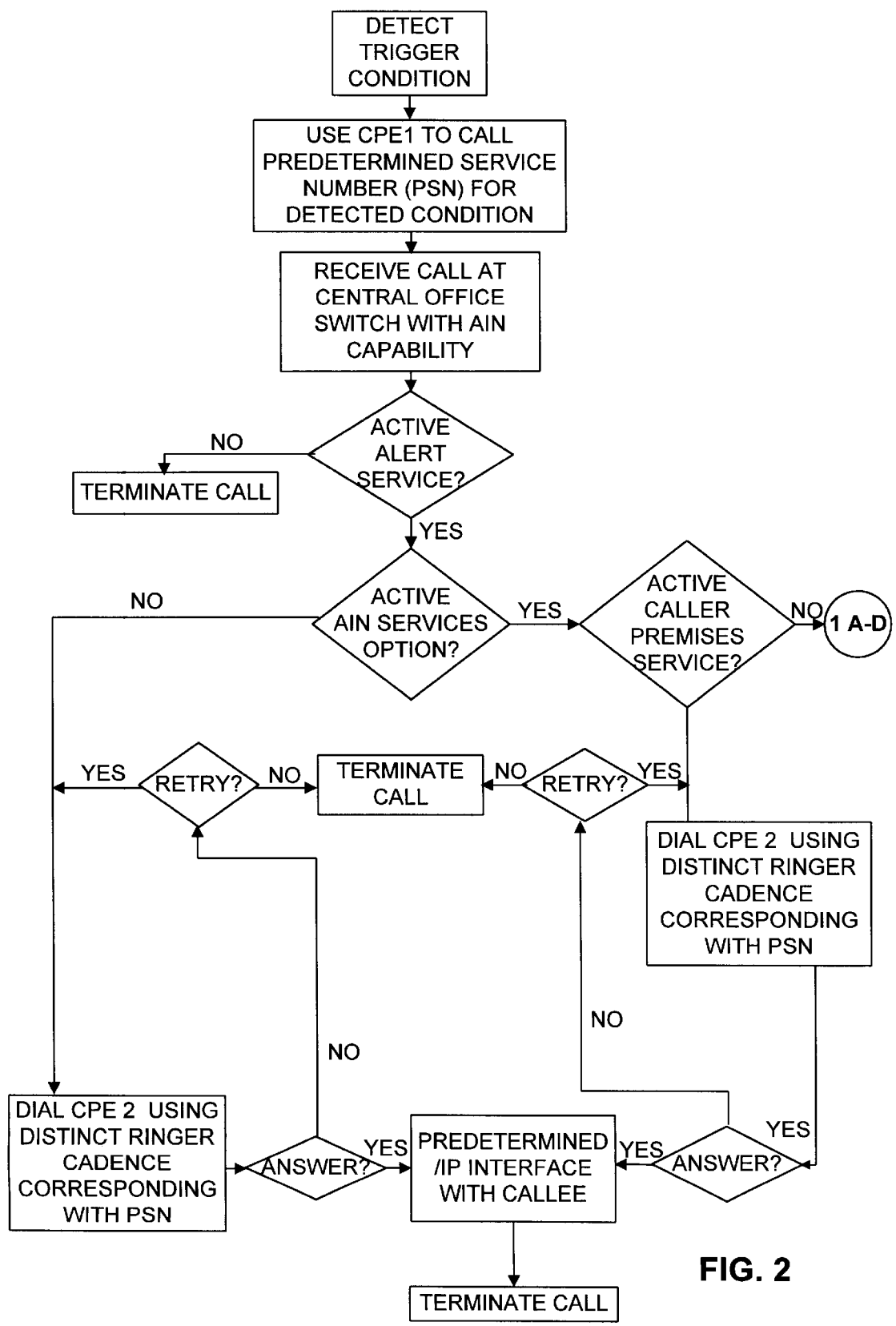
FIG. 2 is a process flow diagram of one embodiment of the present invention.

As indicated in FIG. 2, upon routing a call to CPE 2 24, switch 110 may continue to ring CPE 2 24 until CPE 2 24 is answered by a resident at customer premises 10. If CPE 2 24 is not answered, switch 110 may be preprogrammed to either retry routing of the call to CPE 2 24, or to terminate the call. In the event that the call is answered at CPE 2 24, a predetermined message may be transmitted from the service control point 120 to CPE 2 24 and/or the call may be directly terminated. In the case of a predetermined message transmission, intelligent peripheral 130 may provide a prerecorded voice message that alerts the callee resident at customer premises 10 as to the nature of the triggered-sensor situation.

When special alert services are active with respect to a customer premises 10 (i.e., for alert calls to preestablished stations), service control point 120 can function to not only trigger a call to CPE 2 24 at customer premises 10, as described hereinabove, but may alternatively and/or additionally route the sensor-triggered call to one or more predetermined station numbers. In this regard, it should also be appreciated that such routing to station numbers may be time-sensitive, whereupon for particular sensor-triggered calls occurring during a first predetermined period, service control point 120 may route calls to a first station number as determined by consulting service database 124, and for calls occurring during a second predetermined period, service control point 120 may route the calls to a second station number as determined by consulting database 124.

Figure 3A:
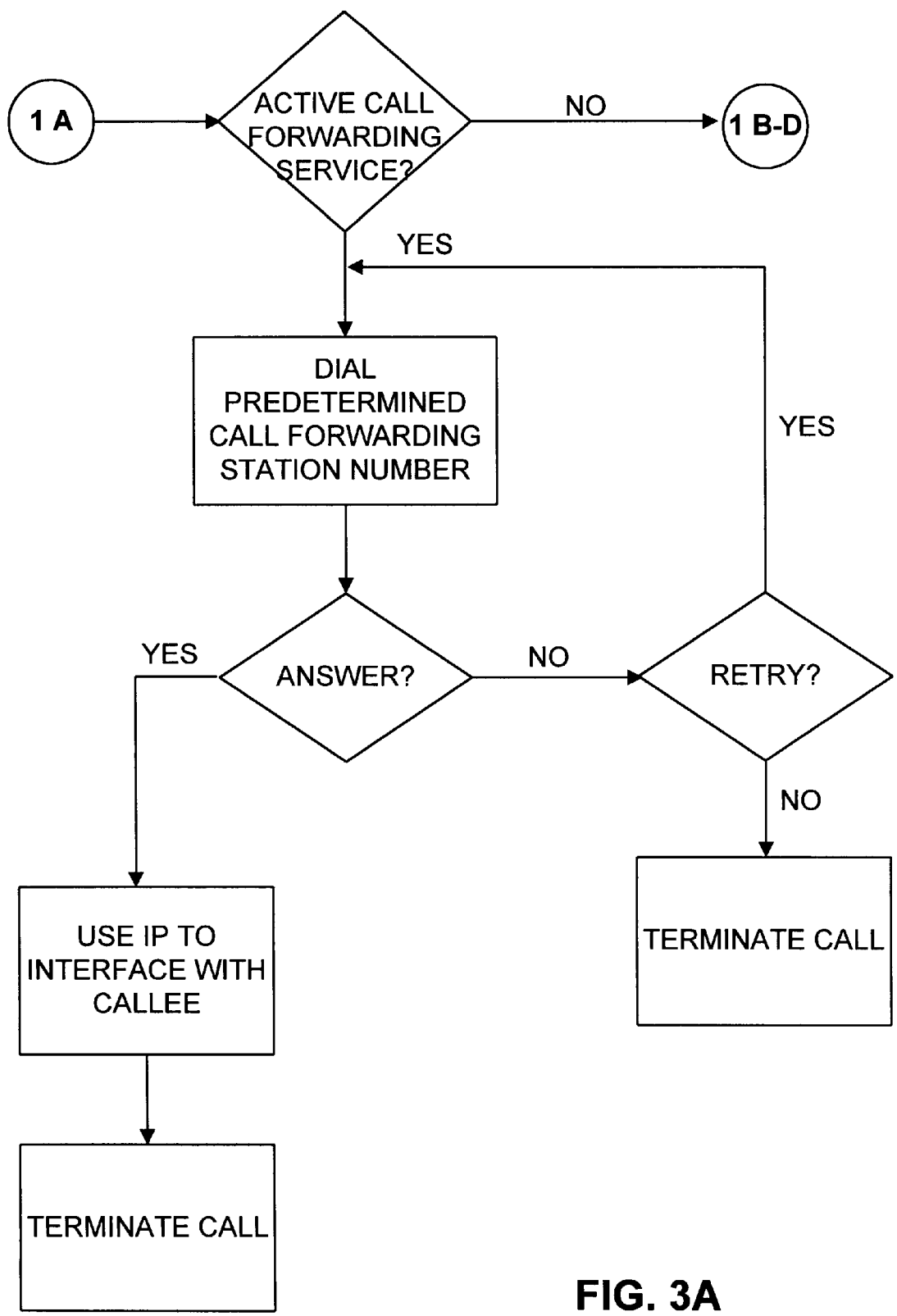
FIGS. 3A–D illustrate response options for the process embodiment of FIG. 2.

FIGS. 3A–3D illustrate a variety of call routing options that can be utilized. By way of example, FIG. 3A illustrates alert call handling when a call forwarding service is active. More particularly, upon receipt of a message at service control point 120, service manager 122 may consult service database 124 to determine whether a call forwarding service is active. If so, a predetermined call forwarding number may be retrieved from database 124 and included in a call processing record that is then transmitted by service manager 122 to the switch 110 at which the alert call has been suspended. The call may then be routed to the retrieved, predetermined call forwarding station number. If such call is answered, a message may be provided to the answering party, for example by utilizing a prerecorded message generated at intelligent peripheral 130. Upon conveyance of such message, the call may be terminated. In the event that the call is not answered at the call forwarding station 320, switch 110 may be preprogrammed to retry routing to the call forwarding station a predetermined number of times (e.g., regular periodic intervals) before terminating the call.

Figure 3B:
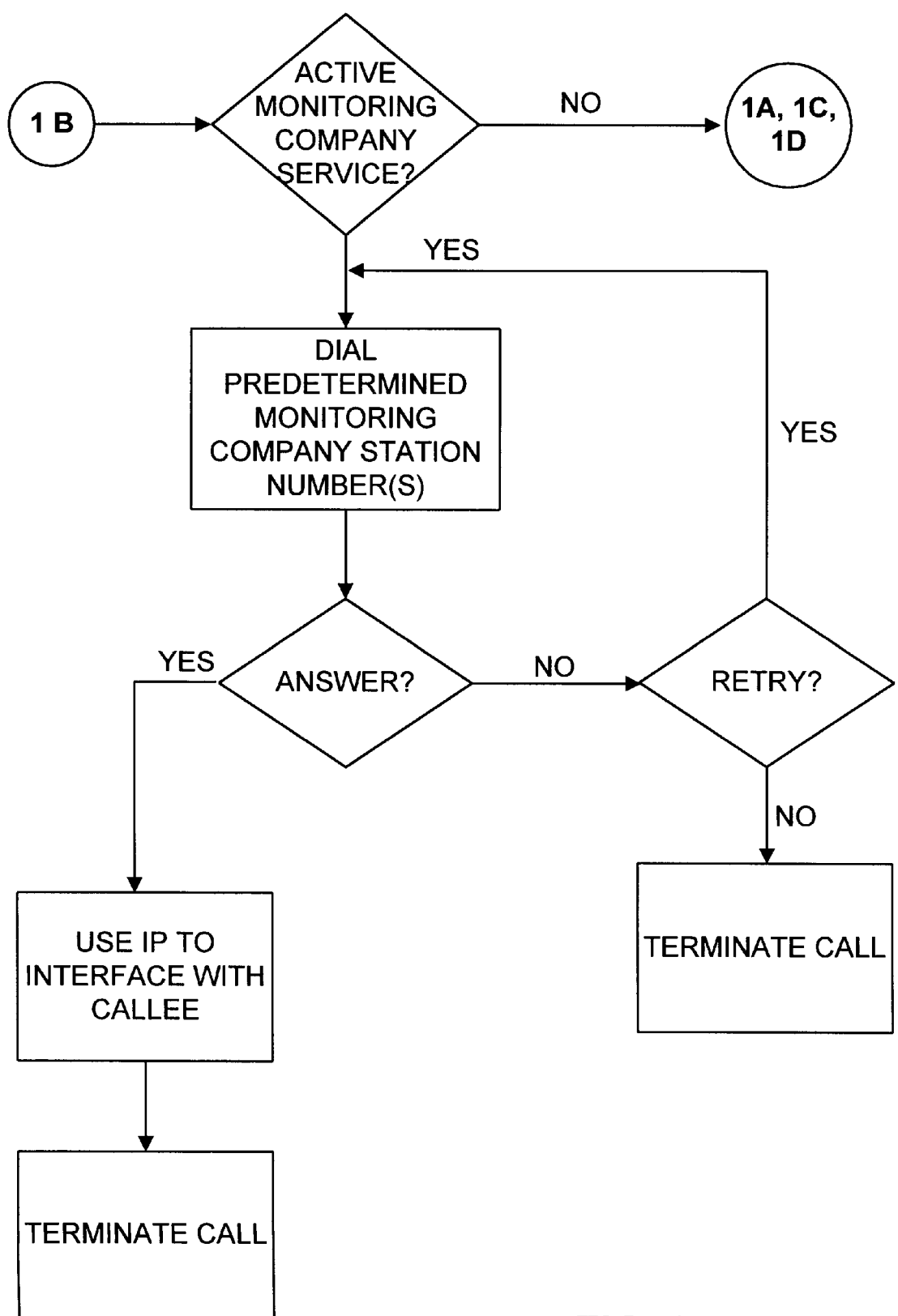
Figure 3C:
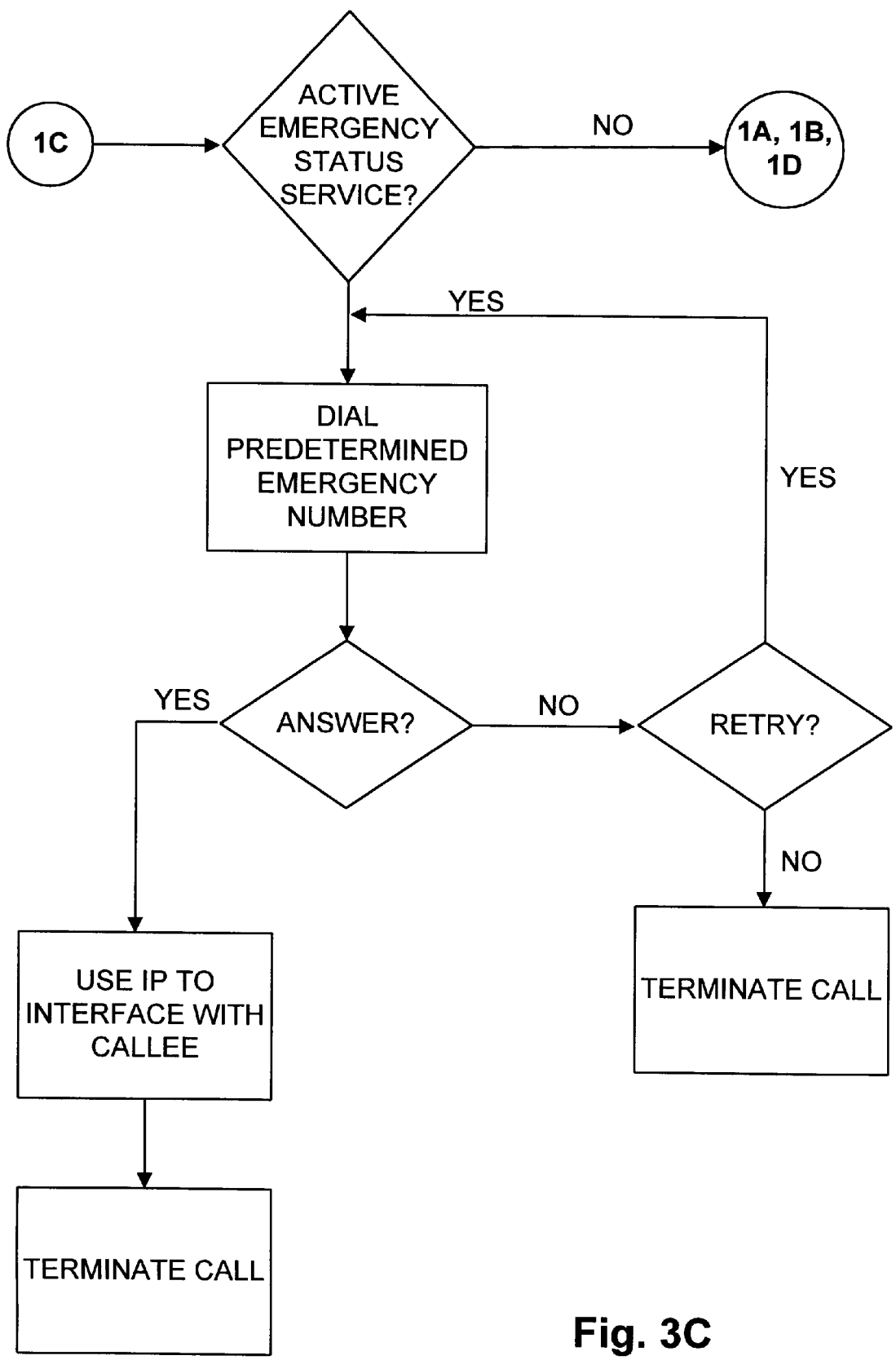
Figure 3D:
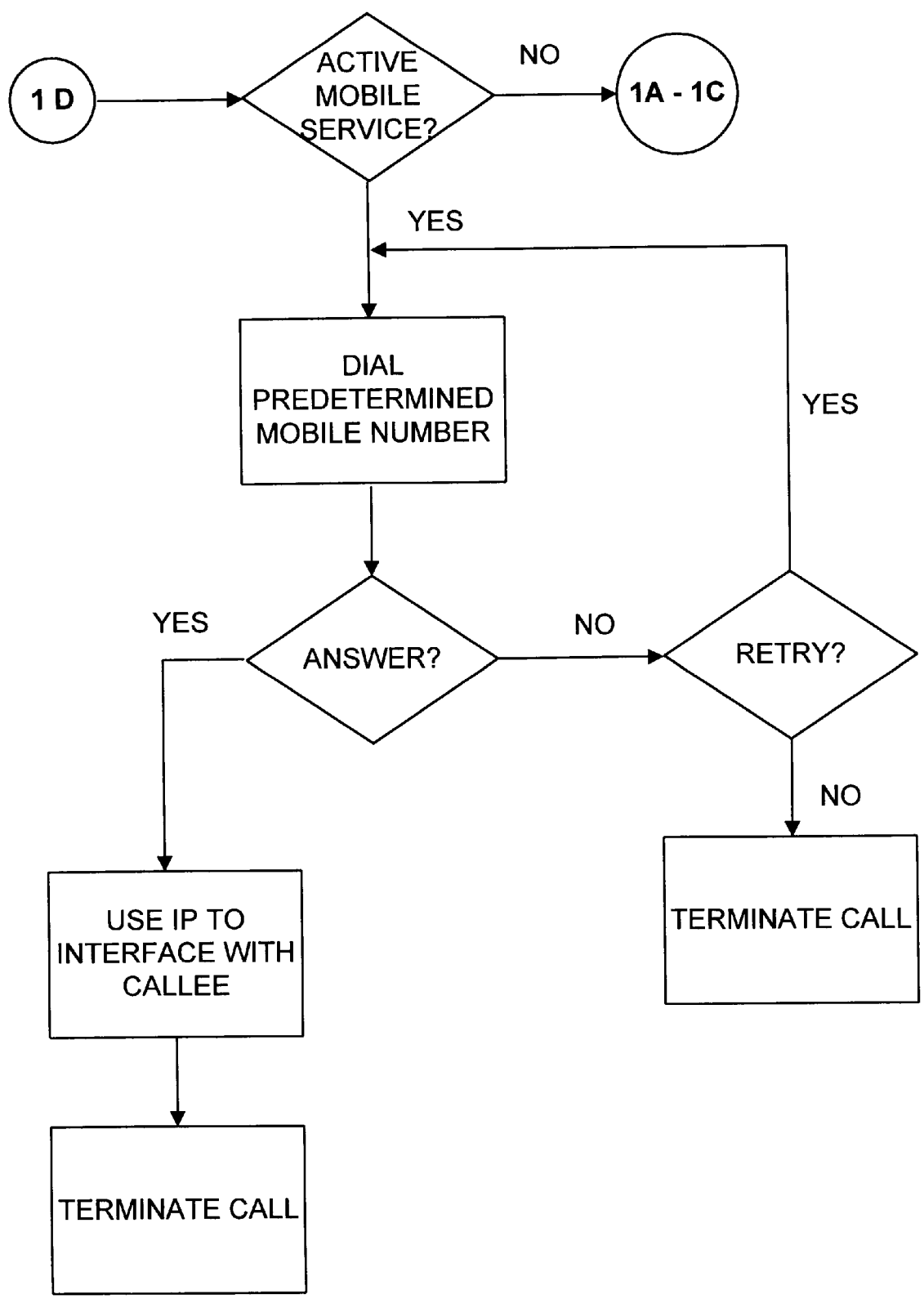

FIG. 3B illustrates analogous process steps that may be carried out in the event that database 124 indicates that, for a particular message corresponding with an alert call received, an active monitoring company service is active for CPE 1 22. FIGS. 3C and 3D also provide for analogous processes in the event mobile station services and emergency station services are active. As will be appreciated, the utilization of a software-driven, programmed service control point 120 allows one or any combination of alert services (i.e., corresponding with FIGS. 3A–3D) to be employed.

The above-described embodiments of the present invention are not exhaustive. Numerous additions and extensions of the present invention will be apparent to those skilled in the art and are considered within the scope of this invention as defined by the claims which follow.

What is claimed is:

1. A method for providing an alert response upon sensing of a predetermined condition of interest at business or residential premises, comprising:

receiving a sensor signal at telephony service equipment, located at said premises, in response to sensing of a predetermined condition of interest at said premises;

using said telephony equipment, in response to receipt of said sensor signal, to automatically provide at least one of:

i) a human-perceivable alert signal at said premises; and ii) initiation of an outgoing telephony call to a predetermined telephone number stored at said telephony equipment, wherein the predetermined telephone number corresponds with a predetermined telephonic switch within a telephony network service control point maintained within a telephony network.

2. A method as claimed in claim 1, wherein said human-perceivable alert signal comprises a cadence distinct from a cadence utilized with said telephony equipment upon receipt of incoming telephony calls from third-party callers.

3. A method as claimed in claim 2, wherein said human-perceivable alert signal is an audible signal having said distinct cadence.

4. A method as claimed in claim 2, wherein said distinct cadence is selected from a plurality of distinct cadences, each of said plurality of distinct cadences corresponding with a different, predetermined condition of interest monitored at said premises.

5. A method as claimed in claim 1, wherein pursuant to said initiation of an outgoing telephony call to a predetermined telephone number, said method further comprises:

receiving an incoming telephony call at said telephony equipment to provide a human-perceivable alert signal.

6. A method as claimed in claim 5, wherein said human-perceivable alert signal is an audible signal having a ringer cadence distinct from a ringer cadence utilized with said telephony equipment upon receipt of incoming telephony calls from third-party callers.

7. A method as claimed in claim 5, wherein said outgoing telephony call is initiated at a first telephony device and said incoming telephony call is received at a second telephony device.

8. A method as claimed in claim 1, wherein said at least one telephonic switch is an AIN-capable switch.

9. A method as claimed in claim 8, wherein upon receipt of a call at said predetermined AIN-capable switch, said switch sends a message to a service control point maintained within a telephony network.

10. A method as claimed in claim 9, wherein pursuant to said initiation of a telephony call to a predetermined telephone number, said method further comprises:

directing a service alert telephony call to a preregistered telephone number retrieved from a database at said service control point.

11. A method as claimed in claim 10, wherein said preregistered telephony number is retrieved utilizing a call processing record corresponding with said outgoing telephony call.

12. A method as claimed in claim 11, wherein said call processing record comprises a station number corresponding with said telephony equipment, and wherein said station number is cross-indexed with said preregistered telephony number in said database.

13. A method as claimed in claim 9, wherein pursuant to said initiation of a telephony call to a predetermined telephone number, said method further comprises:

directing a service alert telephony call to a preregistered telephone number retrieved from a database at said service control point directing a plurality of different preregistered telephone numbers retrieved from a database at said service control point.

14. A method as claimed in claim 1, wherein said predetermined telephone number is selected from a plurality of predetermined telephone alert numbers stored at said telephony equipment, each of said telephone alert numbers corresponding with a different type of predetermined condition of interest monitored at said premises.

15. A method as claimed in claim 14, wherein each of said predetermined telephone alert numbers corresponds with a different, predetermined AIN-capable switch located at one or more central offices within a telephony network.

16. A method as claimed in claim 15, wherein upon receipt of a call at any one of said predetermined AIN-capable switches, said one AIN-capable switch sends a message to a service control point maintained within the telephony network, said message including a call processing record that comprises a station number corresponding with said telephony equipment and the predetermined telephony alert number corresponding with said one predetermined AIN-capable switch.

17. A method as claimed in claim 16, further comprising:

employing said call processing record at said service control point to retrieve at least one preregistered telephony number, wherein said retrieved preregistered telephony number is indexed in corresponding relation to said predetermined telephone number corresponding with said one AIN-capable switch.

18. A method as claimed in claim 17, further comprising:

directing a telephony alert call to a callee station corresponding with said one preregistered telephony number.

19. A method as claimed in claim 18, further comprising:

providing a prerecorded message to a callee answering said telephony call at said callee station.

* * * * *